US010712831B2

(12) United States Patent
Takahashi

(10) Patent No.: US 10,712,831 B2
(45) Date of Patent: Jul. 14, 2020

(54) INFORMATION PROCESSING APPARATUS, METHOD, AND PROGRAM

(71) Applicant: SONY CORPORATION, Tokyo (JP)

(72) Inventor: Kei Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/333,037

(22) PCT Filed: Oct. 13, 2017

(86) PCT No.: PCT/JP2017/037127
§ 371 (c)(1),
(2) Date: Mar. 13, 2019

(87) PCT Pub. No.: WO2018/079301
PCT Pub. Date: May 3, 2018

(65) Prior Publication Data
US 2019/0204933 A1 Jul. 4, 2019

(30) Foreign Application Priority Data

Oct. 25, 2016 (JP) .................................. 2016-208919

(51) Int. Cl.
*G06F 3/044* (2006.01)
*G06F 3/01* (2006.01)
(Continued)

(52) U.S. Cl.
CPC .............. *G06F 3/017* (2013.01); *G06F 1/163* (2013.01); *G06F 1/28* (2013.01); *G06F 1/3293* (2013.01); *G06F 3/01* (2013.01); *G06F 3/011* (2013.01); *G06F 3/012* (2013.01); *G06F 3/044* (2013.01); *G06F 2200/1636* (2013.01);
(Continued)

(58) Field of Classification Search
CPC . G06F 3/017; G06F 3/01; G06F 3/011; G06F 3/012; G06F 3/044; G06F 2200/1636; G06F 2203/04104; G06F 1/163; G06F 1/28; G06F 1/3293
See application file for complete search history.

(56) References Cited

U.S. PATENT DOCUMENTS

2011/0169726 A1* 7/2011 Holmdahl ............... G06F 3/017
345/156
2016/0299570 A1* 10/2016 Davydov ................ G06F 3/014

FOREIGN PATENT DOCUMENTS

JP 2011-227638 A 11/2011
JP 2016-018432 A 2/2016
(Continued)

*Primary Examiner* — Robert J Michaud
(74) *Attorney, Agent, or Firm* — Paratus Law Group, PLLC

(57) ABSTRACT

When first sensor information is input to an information processing unit in an information processing apparatus, the information processing unit detects a trigger operation according to a type of the first sensor information. Moreover, the information processing unit recognizes a gesture operation by a user as an operation input on the basis of second sensor information operation. In addition, the information processing unit determines the operation input on the basis of a combination of the detected trigger operation and the recognized gesture operation. According to the information processing apparatus, it is possible that the operation input is diversified without imposing a burden on the user.

14 Claims, 10 Drawing Sheets

(51) Int. Cl.
*G06F 1/28* (2006.01)
*G06F 1/3293* (2019.01)
*G06F 1/16* (2006.01)
*H04R 1/10* (2006.01)

(52) U.S. Cl.
CPC .. *G06F 2203/04104* (2013.01); *H04R 1/1008* (2013.01); *H04R 1/1041* (2013.01)

(56) References Cited

FOREIGN PATENT DOCUMENTS

| | | |
|---|---|---|
| JP | 2016-149587 A | 8/2016 |
| WO | WO 2015/060856 A1 | 4/2015 |

* cited by examiner

INFORMATION PROCESSING APPARATUS, METHOD, AND PROGRAM

CROSS REFERENCE TO PRIOR APPLICATION

This application is a National Stage Patent Application of PCT International Patent Application No. PCT/JP2017/037127 (filed on Oct. 13, 2017) under 35 U.S.C. § 371, which claims priority to Japanese Patent Application No. 2016-208919 (filed on Oct. 25, 2016), which are all hereby incorporated by reference in their entirety.

TECHNICAL FIELD

The present technology relates to an improvement in operability of a human interface.

BACKGROUND ART

As a human interface for an operation input in the past, a button and a touch panel are the mainstream.

In Patent Literature 1, control of an electronic apparatus without the button is described, and Patent Literature 1 discloses that it is not until a proximity sensor reacts that sensing of a touch device with an electrostatic switch starts.

CITATION LIST

Patent Literature

Patent Literature 1: Japanese Patent Application Laid-open No. 2016-018432

DISCLOSURE OF INVENTION

Technical Problem

However, a complex operation by the button or the touch device is sometimes difficult to perform, particularly in a small apparatus, and a simpler human interface is desired.

In view of the above-mentioned circumstances, it is an object of the present technology to provide an information processing apparatus capable of diversifying an operation input without imposing a burden on a user.

Solution to Problem

A side surface of the present technology achieving the object is an information processing apparatus including a controller unit.

The controller unit detects a trigger operation according to a type of first sensor information.

Moreover, the controller unit recognizes a gesture operation that is performed by a user as an operation input on the basis of second sensor information.

In addition, the controller unit determines the operation input on the basis of a combination of the detected trigger operation and the recognized gesture operation.

According to the information processing apparatus, the number of the operation inputs corresponding to the one gesture operation is not limited to one, and a plurality of operations may be performed. Therefore, the operation input may be diversified without imposing a burden on the user.

The controller unit may recognize the gesture operation on the basis of the second sensor information that is input within a predetermined time after detecting the trigger operation.

According to the information processing apparatus, an effect in which a wrong operation input is not performed in a case that a trigger unintentionally ignites is provided.

The controller unit may detect a single trigger operation in a case that a length of a time in which the first sensor information is continuously input is shorter than a predetermined threshold, may detect a continuous trigger operation in a case that the length of the time in which the first sensor information is continuously input is longer than the predetermined threshold, when the first sensor information is input, and may determine the operation input on the basis of a combination of the detected single trigger operation or the detected continuous trigger operation, and the recognized gesture operation.

According to the information processing apparatus, the two types of trigger operations, the single trigger operation and the continuous trigger operation may be set to the one trigger operation, and the variation of the operation inputs may be spread.

In a case that the controller unit detects the continuous trigger operation, the controller unit may cause the information that is input by the operation input to include a value according to a length of a time of the detected continuous trigger operation.

In that case, the controller unit may determine a time point at which the input of the first sensor information ends as an end point of the time length of the continuous trigger operation.

In that case, the controller unit may determine a time point at which the input of the first sensor information starts as a start point of the length of the time of the continuous trigger operation.

Alternatively, the controller unit may determine a time point at which the continuous trigger operation is detected as a start point of the length of the time of the continuous trigger operation.

Alternatively, the controller unit may determine a time point at which the gesture operation is recognized as a start point of the length of the time of the continuous trigger operation.

In the information processing apparatus, a sensor that outputs the first sensor information may be arranged on a casing that is structured to be physically wearable by the user.

In that case, the sensor may be arranged on a position on which the sensor is capable of detecting an operation by a hand of the user.

In that case, the position on which the sensor is arranged may be a position that is out of a field of view of the user wearing the casing.

According to the information processing apparatus, an operation input interface of a wearable device such as a head mount display or a wearable computer may be provided.

The information processing apparatus may have a first power mode and a second power mode as power consumption modes of the information processing apparatus, and an amount of power consumption of the first power mode may be lower than an amount of power consumption of the second power mode.

In that case, when the information processing apparatus is in the first power mode and the controller unit detects the trigger operation, the controller unit may switch the power consumption mode of the information processing apparatus to the second power mode.

According to the information processing apparatus, the trigger operation may be used as a trigger for switching an operation mode having larger power consumption, and it is possible that power consumption of the apparatus is suppressed.

Moreover, another side surface of the present technology is an information processing method including steps described below.

A step of detecting a trigger operation according to a type of first sensor information.

A step of recognizing a gesture operation that is performed by a user as an operation input on the basis of second sensor information.

A step of determining the operation input on the basis of a combination of the detected trigger operation and the recognized gesture operation.

Moreover, another side surface of the present technology is a program that causes a computer to execute steps described below.

A step of detecting a trigger operation according to a type of first sensor information.

A step of recognizing a gesture operation that is performed by a user as an operation input on the basis of second sensor information.

A step of determining the operation input on the basis of a combination of the detected trigger operation and the recognized gesture operation.

Advantageous Effects of Invention

As described above, according to the present technology, it is possible to provide an information processing apparatus capable of diversifying an operation input without imposing a burden on a user.

Note that the effects described above are not limitative, and with or instead of the effects, any effect described in the present disclosure or other effects that are graspable by the present specification may be produced.

MODE(S) FOR CARRYING OUT THE INVENTION

Hereinafter, with reference to the attached drawings, a preferable embodiment of the present technology will be described in detail. Note that, in the present specification and the drawings, structure components having substantially the same functional structures will be denoted by the same reference symbols and descriptions thereof will be omitted.

Moreover, descriptions will be made in the order described below.

1. Outline of Information Processing Apparatus according to Embodiment of Present Technology
2. Structure
2-1. Outer Appearance Structure
2-2. Internal Structure
3. Operation
4. Summary
5. Modified Example
6. Supplementary Note 1. Outline of Information Processing Apparatus According to Embodiment of Present Technology An information processing apparatus 1 according to the present embodiment includes a wearable device. The wearable device of the present embodiment is not particularly limited as long as the wearable device has a space in which a sensor group described below may be mounted. Examples thereof include a headphone and a head mount display. Moreover, the wearable device of the present embodiment is also applicable to a wristband-type wearable device, a clothes-type wearable device such as a jacket, and the like. Hereinafter, a headphone is employed as the wearable device of the present embodiment. Furthermore, an earphone-type wearable device may be employed instead of the headphone.

The information processing apparatus 1 according to the present embodiment includes a user interface that receives an operation input by a user. A purpose for which the operation input by the user is used is absolutely not limited, and may be news reading application. Hereinafter, an example in which the operation input by the user is used to operate a music player that reproduces music content will be described.

Figure 1:
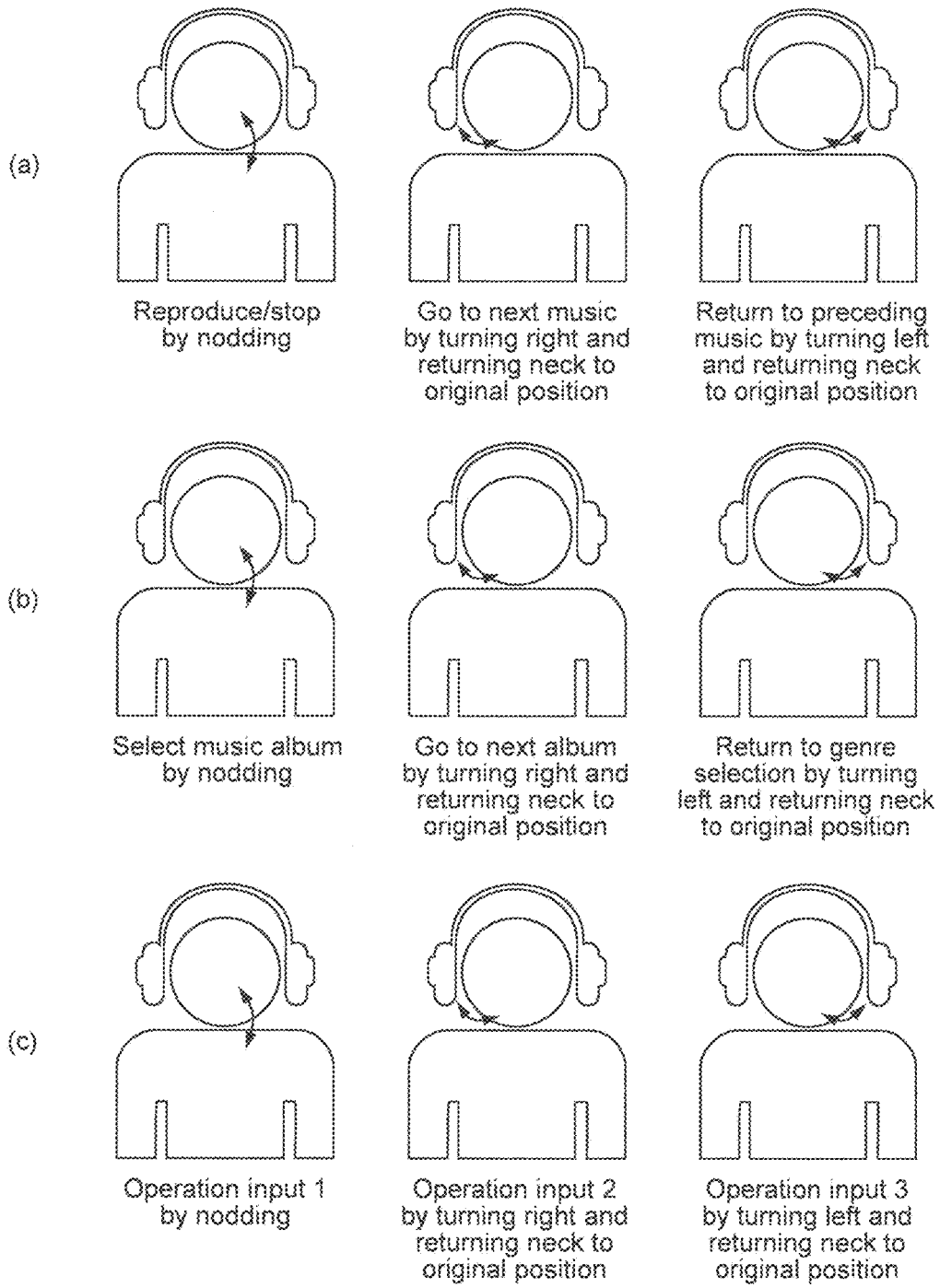
FIG. 1 A diagram for illustrating an outline of an embodiment of the present invention.

FIG. 1 is a diagram for illustrating an outline of the present embodiment. The information processing apparatus 1 according to the present embodiment has a gesture-recognition function of recognizing a motion of the user. Note that, in a case that the user performs the trigger operation and the information processing apparatus 1 detects the trigger operation, gesture recognition is performed. In the present embodiment, there are a plurality of trigger operations, and one method of achieving detection of the plurality of trigger operations is to prepare sensors corresponding to the trigger operations one to one. The information processing apparatus 1 interprets gesture recognition depending on types of the trigger operations and types of gesture recognition.

Note that, in the present embodiment, to "interpret" means to determine a series of trigger operations and the operation input by a gesture operation to be replaced with a processing command to the information processing apparatus 1.

In FIG. 1, an example of the three types of gesture operations, i.e., "nod", "turn right and return neck to original position", and "turn left and return neck to original position", are shown. In the present embodiment, depending on the trigger operation that is performed before the three types of gesture operations are performed, an interpretation of each of the gesture operations is differentiated. For example, FIG. 1 (a) shows a case that a first trigger operation is performed, and FIG. 1 (b) shows a case that a second trigger operation is performed.

Although the same gesture operation of "nod" is performed, the information processing apparatus 1 interprets the gesture operation as "reproduce/stop" of the music player in the case that the first trigger operation is performed in advance (FIG. 1 (a)). On the other hand, the information processing apparatus 1 interprets the same gesture operation as "select music album" in the case that the second trigger operation is performed in advance. With respect to the gesture operation of turning right and the gesture operation of turning left, the similar information processing is performed.

A specific example of the trigger operation is not limited. For example, in a case that the trigger operation is detected by proximity sensors, the proximity sensors are arranged on the right and the left of the headphone respectively. In a case that the user holds the hand near the left headphone, the first trigger operation is detected (FIG. 1 (a)), and in a case that the user holds the hand near the right headphone, the second trigger operation is detected (FIG. 1 (b)).

In a case that the user makes both the right and left proximity sensors react, a third trigger operation is detected. With respect to the third trigger operation, each set of the operation inputs corresponding to the gesture operations is set (FIG. 1 (c)).

The gesture of nodding, turning right, or the like is an easy gesture for everyone to remember. On the other hand, if all the daily motions are interpreted as the operation inputs to the information processing apparatus 1, the operation inputs will be inputs that the user does not intend. However, in the present embodiment, it is not until the trigger operation is detected before gesture recognition that gesture recognition is performed, and the input that the user does not intend may be prevented. Furthermore, as shown in FIG. 1, a variation of the operation inputs that may be input to the information processing apparatus 1 by the same gesture is diversified depending on the types of the trigger operation. Therefore, according to the present embodiment, the operation input may be diversified without imposing a burden on the user.

The outline of the present embodiment is described above. Hereinafter, an external structure and an internal structure will be shown, and detail of a flow of information processing that is executed in the information processing apparatus 1 will be disclosed.

<2-1. Outer Appearance Structure>

Figure 2:
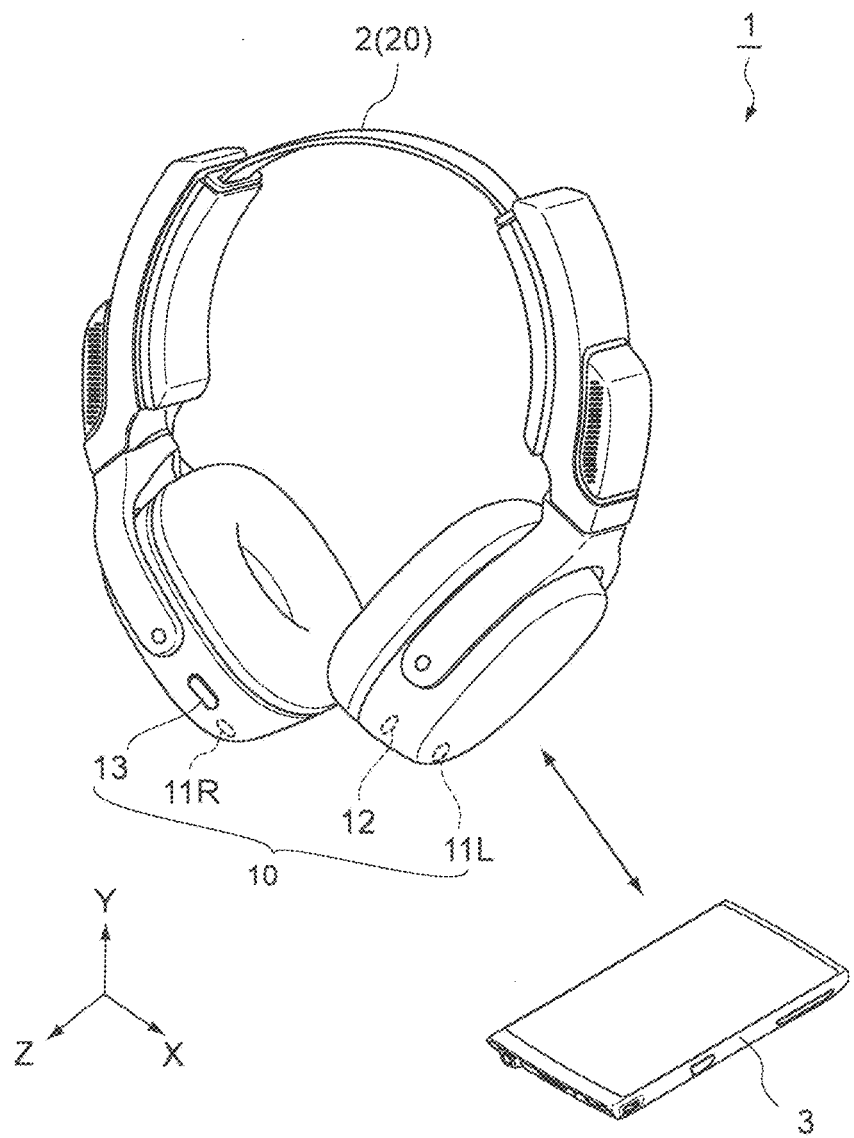
FIG. 2 A diagram showing an outer-appearance-structure example of an information processing apparatus according to the embodiment.
Figure 3:
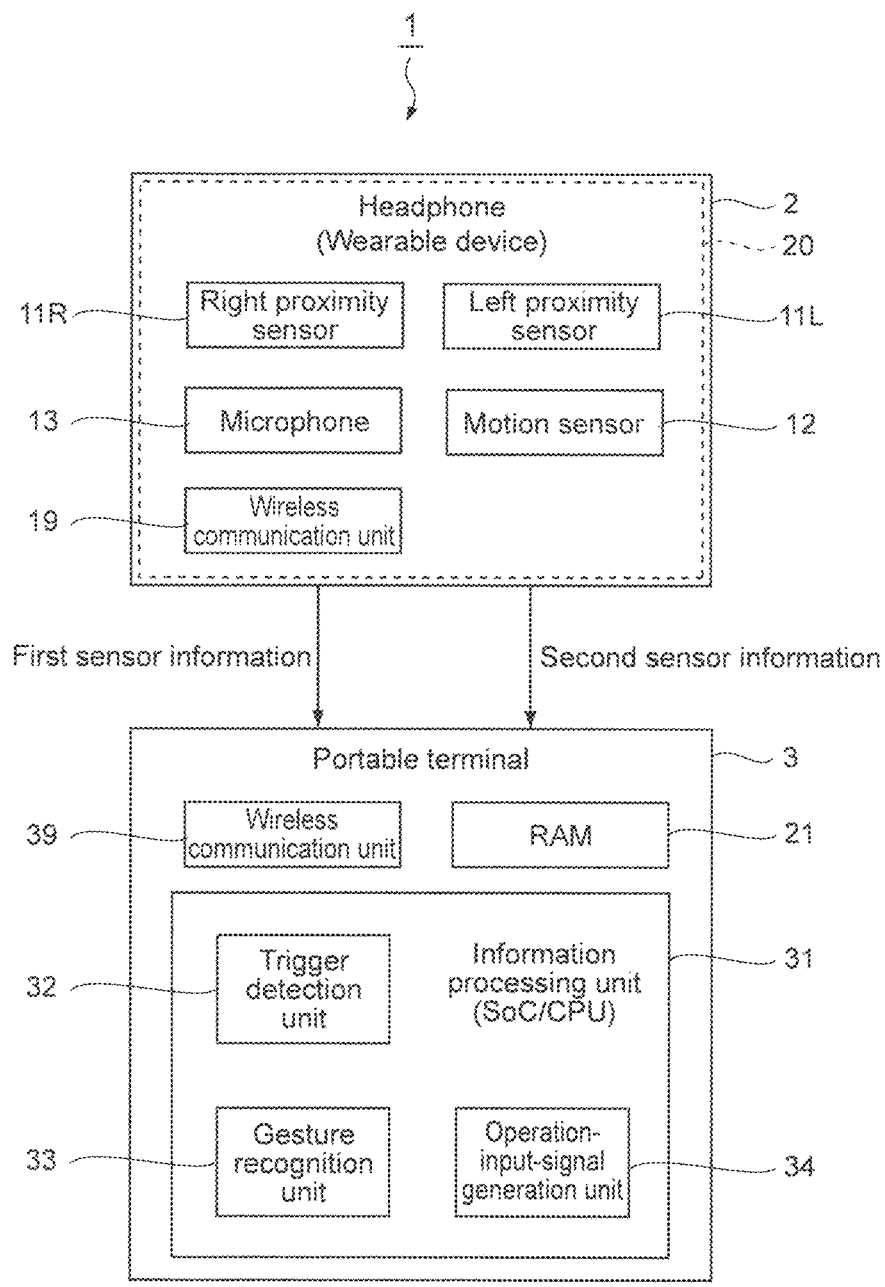
FIG. 3 A block diagram showing an internal-structure example of the information processing apparatus according to the embodiment.

FIG. 2 is a diagram showing an outer-appearance-structure example of the information processing apparatus 1 according to the present embodiment, and FIG. 3 is a block diagram showing an internal-structure example thereof.

As shown in FIG. 2, the information processing apparatus 1 according to the present embodiment may include, for example, a headphone 2 and a portable terminal 3 with respect to a hardware configuration. The headphone 2 includes a sensor group 10. Instead of the hardware-configuration example in FIG. 2, if a device includes a casing 20 that is wearable by the user and on which the sensor group 10 is arranged, any form such as an earphone-type device, a wristband-type device, and a jacket-type device may be used. Moreover, such a device is referred to as wearable device. Note that although "casing" sometimes connotes box shape, "casing" simply means including an exterior body, and a shape thereof is not limited here.

The headphone 2 and the portable terminal 3 include a wireless communication unit 19 and a wireless communication unit 39 respectively, and may communicate with each other. However, a specific communication form thereof is not limited, and may be wired communication. In the present embodiment, each of the wireless communication units includes an antenna and a wireless communication circuit, communicates along a wireless communication standard such as Bluetooth (registered trademark), and detection information of the sensor group 10 is given to the portable terminal 3. A smartphone may be used as the portable terminal 3, for example.

The sensor group 10 in FIG. 2 includes a right proximity sensor 11R, a left proximity sensor 11L, a motion sensor 12, and a microphone 13 as a noise canceller. Furthermore, a switch (not shown) that is connected to short-circuit the microphone may be used as one of the sensors included in the sensor group 10.

The right proximity sensor 11R and the left proximity sensor 11L may be infrared ray systems or other systems. The right proximity sensor 11R and the left proximity sensor 11L continuously output detection signals while sensing. The proximity sensor 11R and the left proximity sensor 11L are used to detect the trigger operation of the user.

The motion sensor 12 is a motion sensor to detect a three-axis acceleration and a three-axis angular velocity. The motion sensor 12 is used to recognize the gesture operation of the user. Alternatively, the motion sensor 12 may be used to recognize the trigger operation.

The microphone 13 as a noise canceller collects sound around the headphone 2, and is a microphone collecting the surrounding sound by a noise cancelling technology that outputs sound having the opposite phase and decreases noise. In a case that the user lightly taps the microphone 13 as the noise canceller by a finger, the operation may be detected as a trigger operation.

In the present embodiment, sensor information that is needed for detecting the trigger operation is referred to as first sensor information, and sensor information that is needed for recognizing the gesture operation is referred to as second sensor information. The sensor information is a bunch of sensor signals that are transmitted by at least one or more of the sensors included in the sensor group 10 when sensing is performed. The first sensor information and the second sensor information may partly overlap with each other.

Hereinafter, the sensor information from at least the right proximity sensor 11R or the left proximity sensor 11L is the first sensor information. Moreover, the sensor information from the motion sensor 12 is the second sensor information. Note that this is an example for the description, for example, the sensor information from the motion sensor 12 may be a part or all of the first sensor information.

<2-2. Internal Structure>

As shown in FIG. 3, the information processing apparatus 1 according to the present embodiment has a structure in which the portable terminal 3 includes an information processing unit 31 in addition to the structure in FIG. 2. The information processing unit 31 may be at least one of arithmetic processing apparatuses in the portable terminal 3, and may include, for example, the central processing unit (CPU: Central Processing Unit), a DSP (Digital Signal Processor), and an SoC (System on Chip). The information processing unit 31 may be designed to include a combination of one or more arithmetic processing devices.

The information processing unit 31 is configured to execute a software program read by a memory such as a RAM 21 (22), and to include a trigger detection unit 32, a gesture recognition unit 33, an operation-input-signal generation unit 34. Hereinafter, an operation of each part will be described.

When the first sensor information is input to the trigger detection unit 32, the trigger detection unit 32 detects a trigger operation according to a type of the input first sensor information. For example, in a case that the first sensor information is a signal indicating sensing of the right proximity sensor 11R, a trigger operation of "user raises and holds right hand on right side of headphone 2" is detected. Alternatively, in a case that the first sensor information is a signal indicating sensing of the left proximity sensor 11L, a trigger operation of "user raises and holds left hand on left side of headphone 2" is detected.

Although not limited, as an example, in a case that the first sensor information is expressed as five-digit digital data in the binary number system, the first sensor information of sensing of the right proximity sensor 11R may be expressed as (00001), the first sensor information of sensing of the left proximity sensor 11L may be expressed as (00010), and the first sensor information may be expressed as (00011) if both the proximity sensors react. The trigger detection unit 32 detects the trigger operation according to each of the digital data.

The gesture recognition unit 33 recognizes the gesture operation by the user as the operation input on the basis of the second sensor information. The gesture operation is determined in advance according to a character of the wearable device and types of usable sensors. In the present embodiment, the headphone is employed as the wearable device, and the motion sensor 12 is used for gesture recognition. Therefore, gesture operations that are determined in advance are, for example, "nod", "shake right", and "shake left" of the neck.

The gesture recognition unit 33 performs gesture recognition on the basis of the second sensor information that is input within a predetermined time after the trigger detection unit 32 detects the trigger operation. The gesture recognition unit 33 may be structured such that it is not until the trigger detection unit 32 detects the trigger operation that the second sensor information is transmitted to the information processing unit 31. Alternatively, the gesture recognition unit 33 may also be structured such that the motion sensor 12 does not operate or operates in a power saving mode until the trigger detection unit 32 detects the trigger operation. The gesture recognition unit 33 continuously recognizes the gesture operation by time-out.

The operation-input-signal generation unit 34 interprets an operation input, which the user intends to input by the gesture operation, on the basis of a combination of the trigger operation detected by the trigger detection unit 32 and the gesture operation recognized by the gesture recognition unit 33. This means that, as described above with reference to FIG. 1, the operation-input-signal generation unit 34 interprets intention of the operation input by the user on the basis of the combination of the trigger operation and the gesture operation. The operation-input-signal generation unit 34 interprets the operation input with reference to a lookup table that is not shown.

On the basis of the interpretation result, the operation-input-signal generation unit 34 generates a signal of an obtained command. The generated signal is output to the latter unit as an operation input signal.

Figure 4:
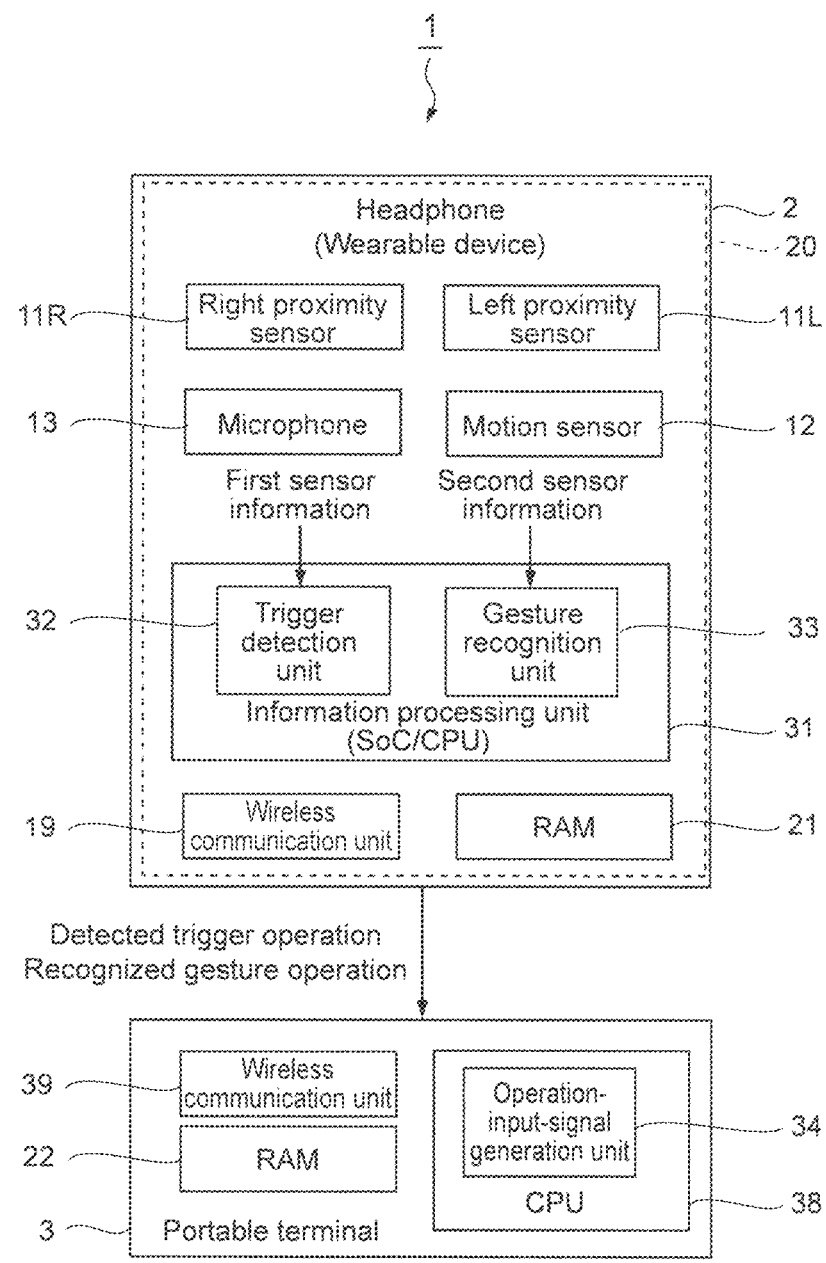
FIG. 4 A diagram showing another example of the internal structure of the information processing apparatus according to the embodiment.
Figure 5:
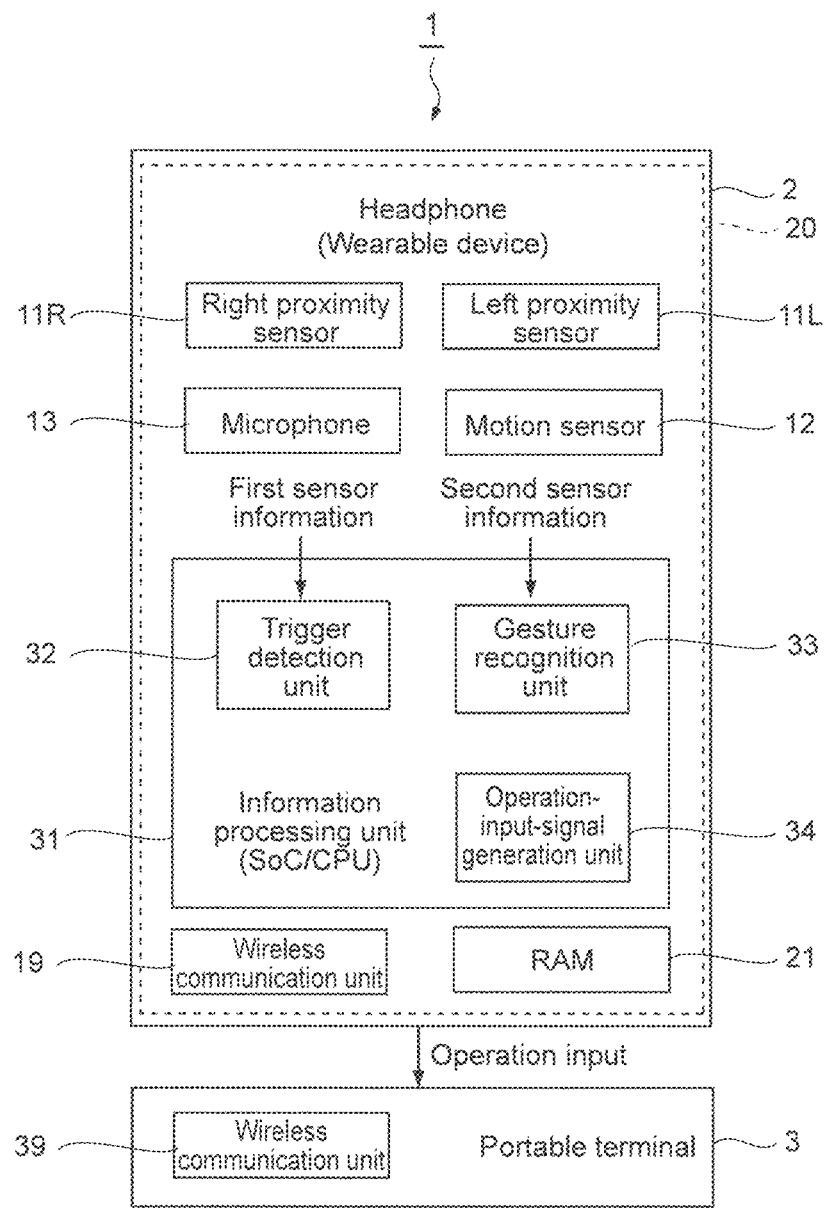
FIG. 5 A diagram showing another example of the internal structure of the information processing apparatus according to the embodiment.

The structure example of the present embodiment is described above. Note that the internal structure of the information processing apparatus 1 is not limited to the example in FIG. 3, and in the structure in FIG. 3, a part or all of the structure components included in the portable terminal 3 may be included in the wearable device. FIGS. 4 and 5 show internal structures in this case.

FIG. 4 is a modified example of the present embodiment in which the trigger operation and gesture recognition are executed in the wearable device. In the present modified example, the portable terminal 3 includes a CPU 38 and the RAM 22, the CPU 38 executes the software program read by the RAM 22, and the operation-input-signal generation unit 34 is generated. It is not necessary that output values of the sensors (sensor information) that the sensor group 10 outputs are wirelessly communicated to the portable terminal 3. Therefore, a battery may be conserved.

FIG. 5 is also a modified example of the present embodiment in which all of the trigger operation, gesture recognition, and generation of the operation input signal are executed in the wearable device. In the information processing apparatus 1, the portable terminal 3 is unnecessary as the structure component. As shown in FIG. 5, it is possible that the information processing apparatus 1 is structured such that all of information processing relating to the present technology is concluded in the wearable device.

3. Operation

Figure 6:
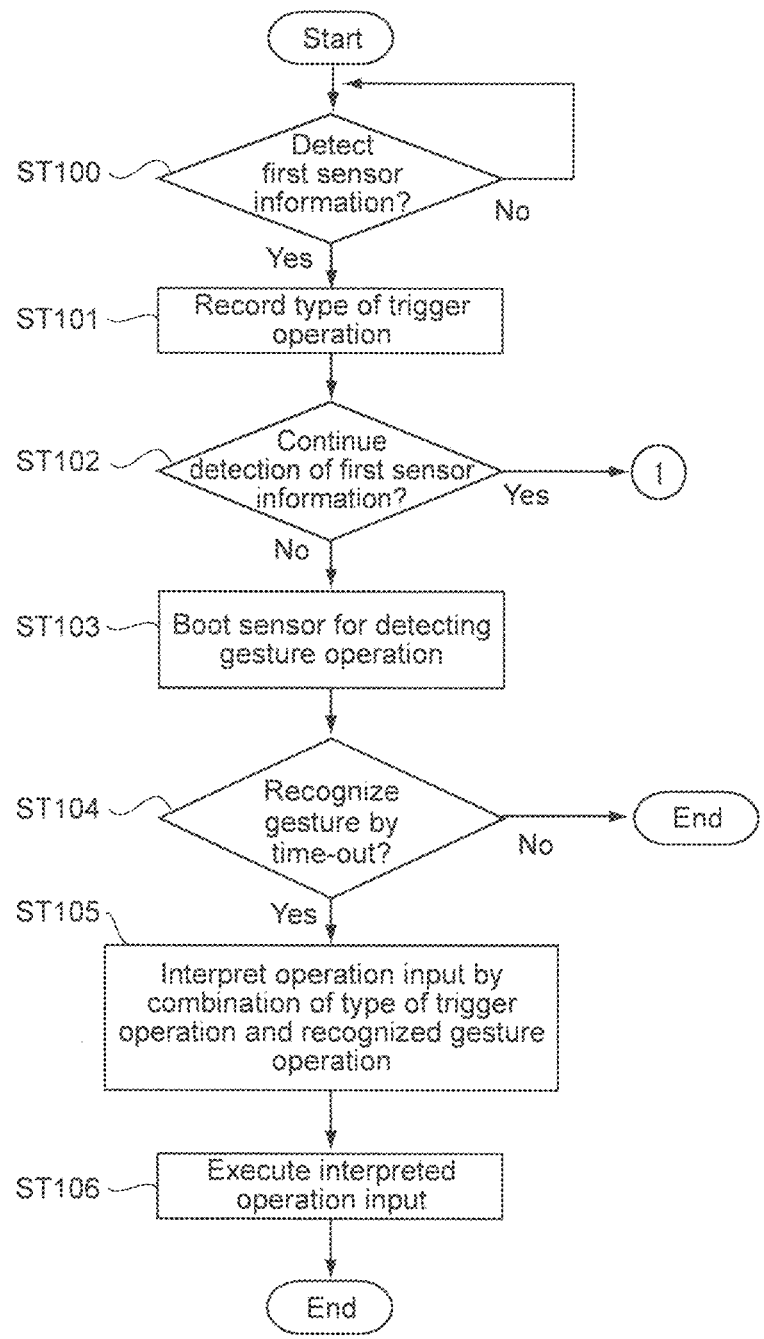
FIG. 6 A flowchart (1) showing a flow of processing of the information processing apparatus according to the embodiment.
Figure 7:
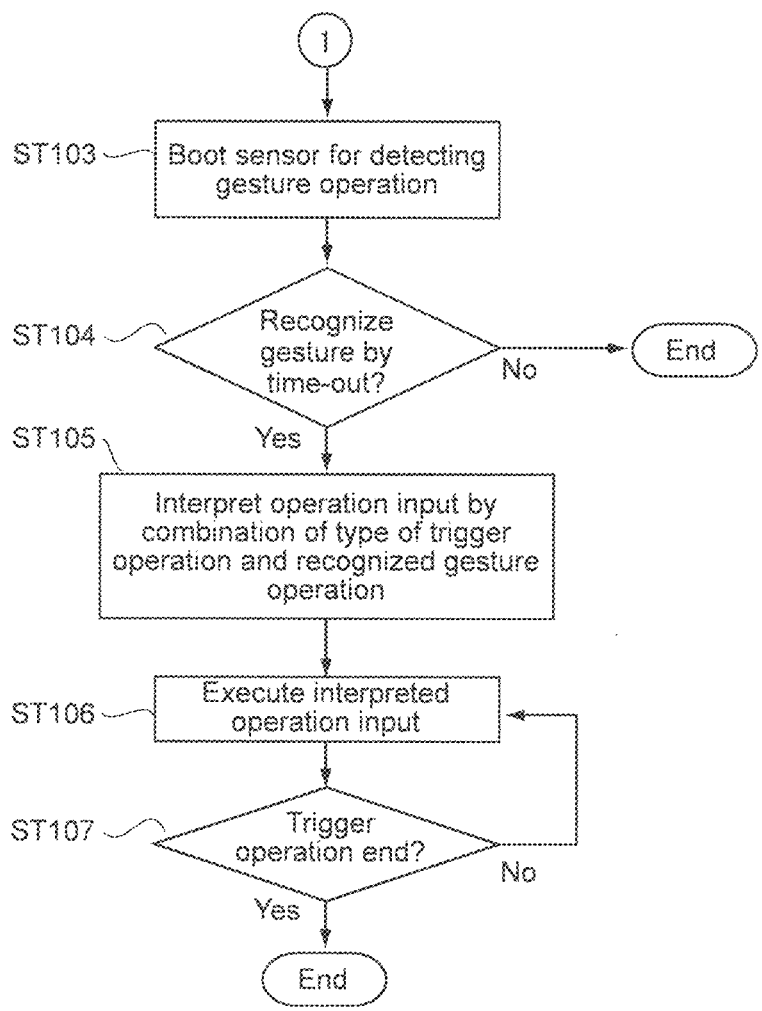
FIG. 7 A flowchart (2) showing the flow of the processing of the information processing apparatus according to the embodiment.
Figure 8:
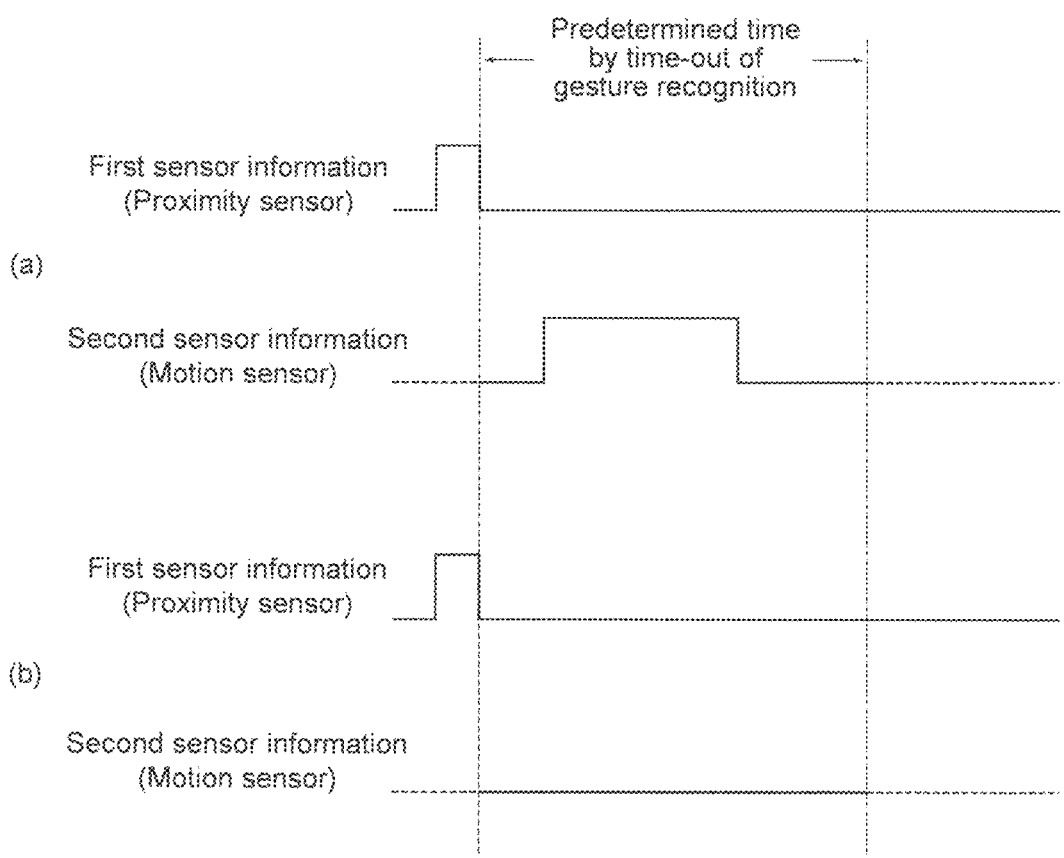
FIG. 8 A timing chart (1) for illustrating the processing of the information processing apparatus according to the embodiment.
Figure 9:
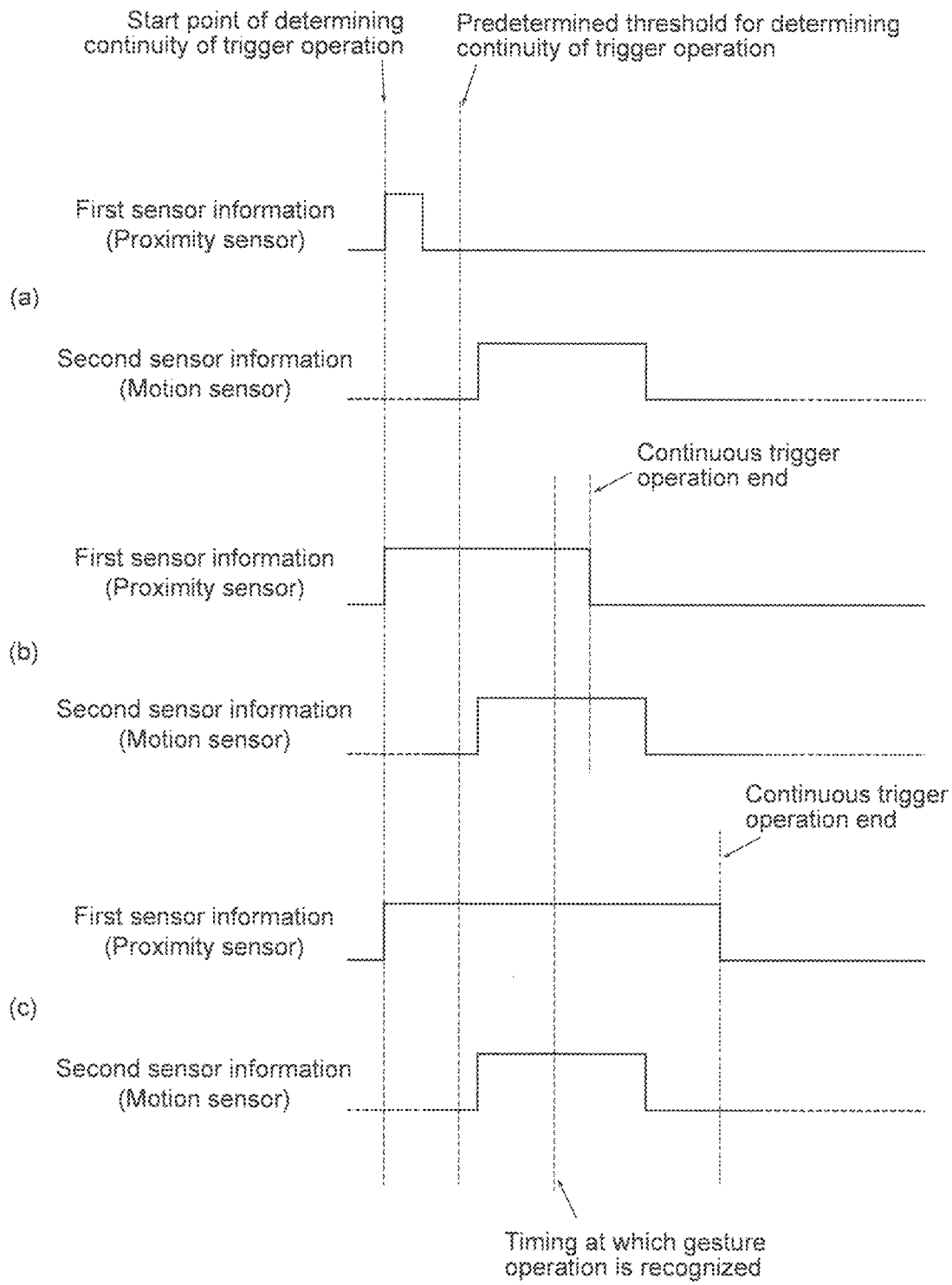
FIG. 9 A timing chart (2) for illustrating the processing of the information processing apparatus according to the embodiment.

FIGS. 6 and 7 are flowcharts showing the flows of information processing in the information processing apparatus 1 according to the present embodiment. FIGS. 8 and 9 are timing charts illustrating the flows of processing in the information processing apparatus 1 according to the present embodiment. Hereinafter, descriptions will be performed with reference to the drawings.

The information processing apparatus 1 waits until the first sensor information is detected by the trigger detection unit 32 (ST100). In this state, functions of the gesture recognition unit 33 and the motion sensor 12 may be limited by a first power consumption mode such as the power saving mode, the amount of power consumption of which is little.

When the first sensor information is input, the trigger detection unit 32 detects the trigger operation (ST100, Yes). Depending on a type of the input first sensor information, the trigger detection unit 32 recognizes a type of the trigger operation, and stores the type in a register or the like included in the information processing unit 31 (ST101). The type of the trigger operation is referred to in ST105.

Examples of the first sensor information include a plurality of types of information such as sensing information of the right proximity sensor 11R, sensing information of the left proximity sensor 11L, and information that the microphone 13 transmits when the microphone 13 is tapped. A type of the trigger operation according to each of the types is detected in the trigger detection unit 32. For example, in a case of the sensing information of the right proximity sensor 11R, the trigger operation of holding the right hand is detected, in a case of the sensing information of the left proximity sensor 11L, the trigger operation of holding the left hand is detected, in a case of sensing information of both the proximity sensors, the trigger operation of holding the both hands, and in a case of the information that the microphone 13 transmits when the microphone 13 is tapped, the tapped trigger operation is detected.

Next, whether the first sensor information is continuously detected or not is determined (ST102). The determination is performed by the operation-input-signal generation unit 34. For example, in a case that the right proximity sensor 11R transmits the sensing information in ST100, whether the sensing information is continuously input or not is determined. The operation-input-signal generation unit 34 determines whether the sensing information is continuously input over a predetermined threshold or not, and determines whether the trigger operation has continuity.

In a case that the input of the first sensor information rises up and falls down within a predetermined time, it is determined that the trigger operation does not continuity (ST102, No). Next, the information processing unit 31 boots the sensor for detecting the gesture operation (ST103). In the present embodiment, the motion sensor 12 is booted. An operation mode of the information processing apparatus 1 after the sensor for detecting the gesture operation is booted is referred to as normal operation mode (second power consumption mode), and switch from the power saving mode to the normal operation mode may be performed. The information processing unit 31 may execute the switch.

Next, the gesture recognition unit 33 waits the second sensor information that may be input within a predetermined time by time-out (ST104). In a case that the gesture operation by the user may not be recognized by the sensing information of the motion sensor 12 (one example of second sensor information) within the predetermined time (ST104, No), the processing ends.

In a case that the gesture operation by the user may be recognized by the sensing information of the motion sensor 12 (one example of second sensor information) within the predetermined time (ST104, Yes), the operation-input-signal generation unit 34 interprets the operation input, which the user intends to do by the gesture operation recognized in ST104, on the basis of a combination of the type of the trigger operation recorded since ST101 and the gesture operation recognized in ST104 (ST105).

As described above with reference to FIG. 1, the same gesture operations become a command of "zoom in" (one example of operation input), a command of "volume down" (one example of operation input), or a command of "return to preceding page" (one example of operation input) by the processing in ST105.

Next, the information processing unit 31 or the portable terminal 3 executes the operation input interpreted in ST105 (ST106). According to content of the operation input, all of the headphone 2 or the information processing apparatus 1 may execute the operation input.

With reference to FIG. 8, time-out in ST104 will be described. In the timing chart of FIG. 8, the upper of each of the sensor information shows that the sensor information is input, and the lower of each of the sensor information shows that the sensor information is not input. The horizontal axes show time.

As shown in FIG. 8 (*a*), if the input of the first sensor information exists, and the trigger operation is detected, the gesture recognition unit 33 will set the predetermined time by time-out. In FIG. 8, a start point of the predetermined time is set to a time point at which detection of the first sensor information ends. Alternatively, the start point of the predetermined time may be set to a time point at which detection of the first sensor information starts.

As shown in FIG. 8 (*b*), if the input of the second sensor information does not exist within the predetermined time, the gesture recognition unit 33 will determine that the gesture operation and the operation input by the user do not exist. Therefore, even if the trigger operation is not a trigger operation that the user does not intend, the wrong input by the information processing apparatus 1 may be suppressed.

Moreover, as shown by the broken lines in FIG. 8, it is determined only within a predetermined time from the time that the trigger operation is detected whether the second sensor information is input or not. Therefore, when the user performs the operation input, the user needs to perform the gesture operation after explicitly performing the trigger operation. Similarly in the structure, the wrong input by the information processing apparatus 1 may be suppressed.

Furthermore, in a case that the input of the second sensor information exists (FIG. 8 (*a*)), whether this is the gesture operation or not is recognized by the gesture recognition unit 33.

The detail of the processing in ST102 in which it is determined that the trigger operation has continuity will be described with reference to FIG. 7. The processing in this case that is similar to the processing in FIG. 6 will be denoted by the same reference symbols, and a description thereof will be omitted.

As shown in FIG. 7, execution of the operation input in ST106 is continuously performed until the trigger operation ends (ST107, Yes). For example, in a case that the trigger operation is the operation of holding the right hand with reaction of the right proximity sensor 11R, the operation input that is interpreted by the combination of the type of the trigger operation and the gesture operation is continuously performed while the right hand is held.

Continuity of the trigger operation will be described with reference to FIG. 9. The timing chart of FIG. 9 is similar to the timing chart of FIG. 8, and the upper of each of the sensor information shows that the sensor information is input, and the lower of each of the sensor information shows that the sensor information is not input. The horizontal axes show time.

The determination of continuity of the trigger operation in ST102 in FIG. 6 is performed by using the predetermined threshold in FIG. 9. The operation-input-signal generation unit 34 determines continuity of the trigger operation on the basis of whether the first sensor information is continuously input over the predetermined threshold for determining continuity of the trigger operation or not, in a case that a time point at which the input of the first sensor information rises up is a start point. In a case that the first sensor information is not continuously input over the predetermined threshold in FIG. 9 (*a*), it is determined that the trigger operation is a single trigger operation. In a case that the first sensor information is continuously input over the predetermined threshold in FIGS. 9 (*b*) and (*c*), it is determined that the trigger operation is a trigger operation having continuity, that is, a continuous trigger operation.

Although sensor devices that output the first sensor information are the same, depending on presence or absence of continuity of the trigger operation, the types of the first sensor information are considered to be different with each other. For example, although the sensor information is output by each of the same right proximity sensors 11R, the single trigger operation and the continuous trigger operation are considered to be different types of sensor information with each other.

Therefore, in interpretation of the operation input (determination of processing command) in ST105 in FIG. 6 or FIG. 7, different interpretation of the operation input may be allotted to each of the single trigger operation and the continuous trigger operation with respect to the same gesture operations.

The method in which the different types of operation inputs of the respective devices that detect the trigger operations, or the respective combinations of the devices with respect to the same gesture inputs is described above. Moreover, the method in which the operation inputs are considered to be different with respect to the trigger operations of the single trigger operation and the continuous trigger operation is also described above. Next, a method in which a continuous value is included in the operation input by using the continuous trigger operation will be described below.

In a case that a music player is made an application, only the operation input described above may not cover all of a user interface required for the music player. For example, various operations such as adjusting volume, feeding an album, skipping continuous music, and switching of shuffle reproduction are needed. Moreover, it is desirable that a continuous value may be appointed when the volume is adjusted.

With respect to only a button operation, it is possible that the continuous value is appointed by pressing and holding a button, for example. However, if there is restriction in a human interface such as a wearable device that may be used to input, some problems may be caused. In a case of a wearable device that does not have a button, it is conceivable that the wearable device inputs by a gesture operation. However, it is difficult that a continuous value is appointed by the gesture operation. This is originated by differences of natural senses of the users.

In the present embodiment, therefore, in a case that a continuous trigger operation is detected with respect to an operation input that needs a continuous value, a value according to a length of a time of the detected continuous trigger operation is used as the continuous value. The length of the time of the continuous trigger operation is extracted as described below.

FIGS. 9 (*b*) and (*c*) will be referred to. It is preferable that an end period, that is, an end point of the length of the time of the continuous trigger operation is a time point at which the continuous trigger operation ends. In other words, the end point is set to a time point at which the input of the first sensor information is stopped or the like. For example, in a case that the user performs a gesture operation such as nodding with the hand held and the proximity sensor made to react, a time point at which holding the hand is stopped becomes the end time point of the continuous trigger operation.

A start point of the length of the time of the continuous trigger operation is not limited, and there are three patterns, for example, a time point at which the input of the first sensor information is started, a time point at which it is determined that the trigger operation has continuity, and a time point at which the gesture operation is recognized. Any pattern may be selected.

The operation-input-signal generation unit 34 generates the command on the basis of the interpreted operation input, and passes the command in the latter processing block. In a case that the continuous value is extracted from the continuous trigger operation by the method described above, a command in which the continuous value or a value according to the continuous value is a factor is generated. The value according to the continuous value is, for example, a value in proportional to the continuous value, a quantum value based on a standard, a value calculated on the basis of a predetermined function (for example, sigmoid function or the like), or the like. According to a target of the operation input, a desired method in which the value according to the continuous value is obtained may be selected.

4. Summary

The main purpose of the embodiment described above is to allow the user to perform a complex operation input without imposing a burden on the user. Lightness and small size are pursued with respect to a wearable device, and size of a human interface that may be included in the wearable device is sometimes about a button. However, the complex operation may not be performed by only the button.

As a result, it is conceivable that, for example, sensing of the proximity sensor is used as a substitute of pressing detection of the button. In this case, however, it is possible that the number of the inputs that the user does not intend is increased. A touch device using an electrostatic switch needs a region having a certain area, and it is feared that miniaturization that is important for the human interface of the wearable device is impossible.

In Patent Literature 1 in the past, the so-called "touch gesture" is used as the operation input. However, a type of a "touch gesture" that the user may record is limited, and there is a problem that a variation of the operation inputs is difficult to increase. There was such a technical problem in the past. On the other hand, according to the present embodiment described above, the number of the operation inputs corresponding to the one gesture operation is not limited to one, and a plurality of operations may be performed. In other words, according to the present embodiment, the operation input may be diversified without a burden imposed on the user.

Moreover, as described above with reference to FIG. 8, in a case that the gesture recognition does not exist by time-out, according to the structure of the present embodiment in which the processing command according to the operation input is not determined, the input that the user does not intend may be prevented, and the wrong operation input is not performed when the trigger unintentionally ignites.

In addition, in the present embodiment, the single trigger operation is detected in a case that the length of the time in which the first sensor information is continuously input is shorter than the predetermined threshold, and the continuous trigger operation is detected in a case that the length of the time in which the first sensor information is continuously input is longer than the predetermined threshold, when the first sensor information is input. Then, the operation input is interpreted on the basis of the combination of the detected single trigger operation or the detected continuous trigger operation, and the recognized gesture operation. Therefore, the two types of trigger operations, the single trigger operation and the continuous trigger operation may be set to the one trigger operation, and the variation of the operation inputs may be spread.

Moreover, in the present embodiment, in a case that the continuous trigger operation is detected, the value according to the length of the time of the detected continuous trigger operation is included in the information input by the operation input. Due to this, the operation input using the continuous value may be robustly recognized without a difference between different gesture operations by the respective individuals, and may be performed by an easy operation of holding the hand and making the proximity sensor react, and then, removing the hand and stopping the proximity sensor reacting.

5. Modified Example

Furthermore, the present embodiment may be modified as described below.

For example, the headphone 2 is shown as the wearable device in the embodiment. However, the wearable device is not limited to this. Other examples of a wearable device include a headset and a neckband-type terminal that is physically wearable on the shoulder, for example. The embodiment described above may be modified with such an apparatus.

Figure 10:
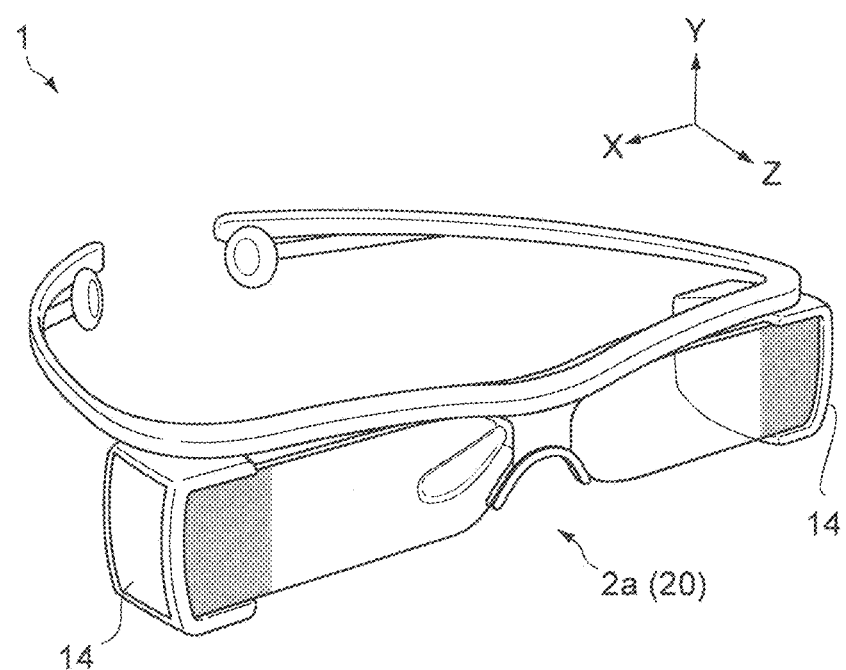
FIG. 10 A diagram showing an outer-appearance-structure example in a modified example of the embodiment.

Furthermore, the embodiment is applicable to a head mount display. FIG. 10 is a diagram showing an outer-appearance-structure example of the information processing apparatus 1 in the modified embodiment in which the present technology is applied to a head mount display.

As shown in FIG. 10, in the present modified example, a spectacle-type head mount display 2a is employed as the casing 20 that is structured to be physically wearable by the user. The spectacle-type head mount display 2a includes electrostatic touch devices 14.

The arranged position of the touch device 14 is not limited, and may be a position on which the operation by the hand of the user is detectable when the spectacle-type head mount display 2a is worn by the user. For example, as shown in FIG. 10, the touch devices 14 are structured such that the touch devices 14 are arranged around temples of the user wearing the spectacle-type head mount display 2a.

In the present modified example, the touch devices 14 provide the function that is similar to the function, which is provided by the proximity sensor 11R and the left proximity sensor 11L in the structure example in FIG. 2. In other words, the touch devices 14 generate the first sensor information that is needed to detect the trigger operation by sensing, and input the first sensor information to the information processing apparatus 1.

The touch device 14 may be a touch device that is capable of detecting touch of the finger of the user not only at a single point but also at multipoint. The multipoint-type touch device is the touch device 14 capable of sensing one or more touch points. In this case, for example, a trigger operation by touch of the one finger and a trigger operation by touch of the two fingers may be considered to be different trigger operations. Furthermore, depending on the number of the touch points sensed by the touch device 14, the trigger detection unit 32 is structured to detect different types of trigger operations.

The arranged position of the touch device 14 is not limited to be around the temple of the user, and may be within a range in which the hand of the user physically reaches the touch device 14 such that the operation by the hand of the user is detectable. Furthermore, the touch device 14 may be arranged out of the field of view of the user wearing the casing 20. Even if the touch device 14 is arranged on a position on which the user wearing the casing 20 is not capable of directly performing visual recognition, according to the present modified example to which the present technology is applied, it will be possible that the user may perform the operation input to the information processing apparatus 1 on the basis of the trigger operation and the gesture operation by the user, without vision of the user.

With respect to a head mount display, there are some needs. For example, when the user is watching virtual-reality content, the user sometimes wants to perform any input to the system. In a case that the user performs the input without a remote controller, in the present modified example, it is possible that the user performs the input to the system by tapping a part of the spectacle-type head mount display 2a (touch device 14) and performing the gesture operation. Note that the spectacle-type head mount display 2a may include a transmission-type display, and may include a non-transmission-type display.

6. Supplementary Note

A part of technical ideas disclosed in the present specification may be described below in (1) to (11).

(1)
An information processing apparatus, including
a controller unit that detects a trigger operation according to a type of first sensor information, recognizes a gesture operation that is performed by a user as an operation input on the basis of second sensor information, and determines the operation input on the basis of a combination of the detected trigger operation and the recognized gesture operation.

(2)
The information processing apparatus according to (1), in which
the controller unit recognizes the gesture operation on the basis of the second sensor information that is input within a predetermined time after detecting the trigger operation.

(3)
The information processing apparatus according to (1) or (2), in which
the controller unit
detects a single trigger operation in a case that a length of a time in which the first sensor information is continuously input is shorter than a predetermined threshold, detects a continuous trigger operation in a case that the length of the time in which the first sensor information is continuously input is longer than the predetermined threshold, when the first sensor information is input, and
determines the operation input on the basis of a combination of the detected single trigger operation or the detected continuous trigger operation, and the recognized gesture operation.

(4)
The information processing apparatus according to (3), in which
in a case that the controller unit detects the continuous trigger operation, the controller unit causes the information that is input by the operation input to include a value according to a length of a time of the detected continuous trigger operation.

(5)
The information processing apparatus according to (4), in which
the controller unit determines a time point at which the input of the first sensor information ends as an end point of the time length of the continuous trigger operation.

(6)
The information processing apparatus according to (4) or (5), in which
the controller unit determines a time point at which the input of the first sensor information starts as a start point of the length of the time of the continuous trigger operation.

(7)
The information processing apparatus according to (4) or (5), in which
the controller unit determines a time point at which the continuous trigger operation is detected as a start point of the length of the time of the continuous trigger operation.

(8)
The information processing apparatus according to (4) or (5), in which the controller unit determines a time point at which the gesture operation is recognized as a start point of the length of the time of the continuous trigger operation.

(9)

The information processing apparatus according to any one of (1) to (8), in which a sensor that outputs the first sensor information is arranged on a casing that is structured to be physically wearable by the user, and the sensor is arranged on a position on which the sensor is capable of detecting an operation by a hand of the user.

(10)

The information processing apparatus according to (9), in which the position on which the sensor is arranged is a position that is out of a field of view of the user wearing the casing.

(11)

The information processing apparatus according to (9) or (10), in which the first sensor information is sensing information of a touch sensor that is capable of sensing one or more touch points, and the controller unit detects the trigger operation according to a number of the touch points that the touch sensor senses.

(12)

The information processing apparatus according to any one of (1) to (11), in which the information processing apparatus has a first power mode and a second power mode as power consumption modes of the information processing apparatus, when the information processing apparatus is in the first power mode and the controller unit detects the trigger operation, the controller unit switches the power consumption mode of the information processing apparatus to the second power mode, and an amount of power consumption of the first power mode is lower than an amount of power consumption of the second power mode.

(13)

An information processing method, including:

detecting a trigger operation according to a type of first sensor information;

recognizing a gesture operation that is performed by a user as an operation input on the basis of second sensor information; and determining the operation input on the basis of a combination of the detected trigger operation and the recognized gesture operation.

(14)

A program, that causes a computer to execute:

a step of detecting a trigger operation according to a type of first sensor information;

a step of recognizing a gesture operation that is performed by a user as an operation input on the basis of second sensor information; and a step of determining the operation input on the basis of a combination of the detected trigger operation and the recognized gesture operation.

REFERENCE SIGNS LIST 1 information processing apparatus
2 headphone
2a spectacle-type head mount display
3 portable terminal
11R right proximity sensor
11L left proximity sensor
12 motion sensor
13 microphone
14 touch device
19 wireless communication unit
20 casing
21, 22 RAM
31 information processing unit (SoC/CPU)
32 trigger detection unit
33 gesture recognition unit
34 operation-input-signal generation unit
38 CPU
39 wireless communication unit

The invention claimed is:

1. An information processing apparatus, comprising
a controller unit configured to
detect a trigger operation according to a type of first sensor information,
recognize a gesture operation that is performed by a user as an operation input on a basis of second sensor information, and
determine the operation input on a basis of a combination of the detected trigger operation and the recognized gesture operation,
wherein the controller unit detects a single trigger operation based on a determination that a length of a time in which the first sensor information is continuously input is shorter than a predetermined threshold, and detects a continuous trigger operation different than the single trigger operation based on a determination that the length of the time in which the first sensor information is continuously input is longer than the predetermined threshold, and
wherein the controller unit is implemented via at least one processor.

2. The information processing apparatus according to claim 1, wherein
the controller unit recognizes the gesture operation on a basis of the second sensor information that is input within a predetermined time after detecting the trigger operation.

3. The information processing apparatus according to claim 1, wherein
the controller unit determines the operation input as a first operation input on a basis of a combination of the detected single trigger operation and the recognized gesture operation, and determines the operation input as a second operation input different than the first operation input on a basis of a combination of the detected continuous trigger operation and the recognized gesture operation.

4. The information processing apparatus according to claim 3, wherein
in a case that the controller unit detects the continuous trigger operation, the controller unit causes information that is input by the operation input to include a value according to a length of a time of the detected continuous trigger operation.

5. The information processing apparatus according to claim 4, wherein
the controller unit determines a time point at which the input of the first sensor information ends as an end point of a time length of the continuous trigger operation.

6. The information processing apparatus according to claim 4, wherein the controller unit determines a time point at which the input of the first sensor information starts as a start point of the length of the time of the continuous trigger operation.

7. The information processing apparatus according to claim 4, wherein
the controller unit determines a time point at which the continuous trigger operation is detected as a start point of the length of the time of the continuous trigger operation.

8. The information processing apparatus according to claim 4, wherein
the controller unit determines a time point at which the gesture operation is recognized as a start point of the length of the time of the continuous trigger operation.

9. The information processing apparatus according to claim 1, wherein
a sensor that outputs the first sensor information is arranged on a casing that is structured to be physically wearable by the user, and
the sensor is arranged on a position on which the sensor is capable of detecting an operation by a hand of the user.

10. The information processing apparatus according to claim 9, wherein
the position on which the sensor is arranged is a position that is out of a field of view of the user wearing the casing.

11. The information processing apparatus according to claim 9, wherein
the first sensor information is sensing information of a touch sensor that is capable of sensing one or more touch points, and
the controller unit detects the trigger operation according to a number of the touch points that the touch sensor senses.

12. The information processing apparatus according to claim 1, wherein
the information processing apparatus includes a first power mode and a second power mode as power consumption modes of the information processing apparatus,
when the information processing apparatus is in the first power mode and the controller unit detects the trigger operation, the controller unit switches the power consumption mode of the information processing apparatus to the second power mode, and
an amount of power consumption of the first power mode is lower than an amount of power consumption of the second power mode.

13. An information processing method, comprising:
detecting a trigger operation according to a type of first sensor information;
recognizing a gesture operation that is performed by a user as an operation input on a basis of second sensor information; and
determining the operation input on a basis of a combination of the detected trigger operation and the recognized gesture operation,
wherein the detecting of the trigger operation includes detecting a single trigger operation based on a determination that a length of a time in which the first sensor information is continuously input is shorter than a predetermined threshold, and detecting a continuous trigger operation different than the single trigger operation based on a determination that the length of the time in which the first sensor information is continuously input is longer than the predetermined threshold.

14. A non-transitory computer-readable medium having embodied thereon a program, which when executed by a computer causes the computer to execute a method, the method comprising:
detecting a trigger operation according to a type of first sensor information;
recognizing a gesture operation that is performed by a user as an operation input on a basis of second sensor information; and
determining the operation input on a basis of a combination of the detected trigger operation and the recognized gesture operation,
wherein the detecting of the trigger operation includes detecting a single trigger operation based on a determination that a length of a time in which the first sensor information is continuously input is shorter than a predetermined threshold, and detecting a continuous trigger operation different than the single trigger operation based on a determination that the length of the time in which the first sensor information is continuously input is longer than the predetermined threshold.

* * * * *